United States Patent [19]

Wogman et al.

[11] 3,723,727
[45] Mar. 27, 1973

[54] IN-SITU NEUTRON ACTIVATION

[75] Inventors: Ned A. Wogman; Richard W. Perkins; Henry G. Rieck; John A. Cooper, all of Richland, Wash.

[73] Assignee: The United States of America as represented by the United States Atomic Energy Commission

[22] Filed: June 30, 1971

[21] Appl. No.: 158,309

[52] U.S. Cl. ............. 250/83.3, 250/83.6 S, 250/84.5, 250/106 S
[51] Int. Cl. ................................................. G01t 1/16
[58] Field of Search ........... 250/83.3, 83.6 PS, 83.6 S

[56] References Cited

UNITED STATES PATENTS

| 2,781,453 | 2/1957 | Belcher et al. | 250/83.6 S |
| R26,489 | 11/1968 | Rickard | 250/83.3 R |
| 2,303,688 | 12/1942 | Fearon | 250/83.6 PS |
| 3,546,456 | 12/1970 | Grice | 250/83.3 |

Primary Examiner—James W. Lawrence
Assistant Examiner—Harold A. Dixon
Attorney—Roland A. Anderson

[57] ABSTRACT

A probe for in-situ neutron activation analysis has a neutron source and a detector positioned in a fixed relationship. The material being analyzed is irradiated by the neutron source and then the detector is moved over the material for analysis. At all times the fixed spaced-apart relationship of the detector and the neutron source is maintained. The probe is particularly adapted for analysis of materials in inaccessible places such as the sea floor and includes a pressure plate for maintaining the material being analyzed in a fixed location during the analysis.

1 Claim, 8 Drawing Figures

3,723,727

IN-SITU NEUTRON ACTIVATION

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In-situ elemental analysis is extremely desirable in a large number of applications. Mapping of the mineral composition of terrestrial areas and of the ocean floor could be greatly simplified by rapid in-situ elemental analysis. Surfaces of planets could also be analyzed remotely in this manner. The applicability of neutron activation analysis for determining the elemental content of rocks and ores is well established. The normal procedure involves irradiation of a mineral specimen in a nuclear reactor followed by an analysis of the amounts of the various radionuclides which are produced. From the amounts of the radionuclides produced, the concentrations of the specimen's stable elements are established. While this approach is very dependable and permits the absolute amounts of many of the elements to be measured rather precisely, it has not gained wide acceptance in mineral assay and exploration. The rather high cost of even small nuclear reactors together with high operating costs have limited their availability and practicability to relatively few laboratories. Portable neutron generators have not proved practical for mineral analysis, particularly in remote and hostile environments, such as the ocean floor.

When neutrons are captured by the various elements in a mineral sample, "prompt gamma rays" are immediately emitted and their measurement can be employed to determine the elemental content of the sample. Devices using these prompt gamma rays have been developed for exploration of the ocean bottom. While the detection of prompt gamma rays allows measurement of certain elements, the necessarily small physical separation of the neutron source from the gamma-ray detector makes it an insensitive procedure for the nondestructive analysis of many of the elements of minerals.

It is therefore an object of this invention to provide an improved method of mineral analysis of neutron activation.

Another object of this invention is to provide a method of neutron activation analysis which can be carried out in remote and hostile environments.

SUMMARY OF THE INVENTION

In practicing this invention, a neutron source, for example $^{252}Cf$, is provided for irradiation of the mineral sample. The neutron source is embedded in a moderator so that thermal neutrons are developed. A detector is placed a fixed distance from the neutron source and shielded therefrom. The apparatus is mounted on a framework which permits it to be positioned in remote and hostile environments such as the ocean floor. When the device is in position for making an analysis of material, the neutron source is positioned over the material and the material is irradiated for a predetermined length of time. After irradiation by the neutron source, the source is moved away from the material while the detector is moved to a position over the material. The detector develops an output which depends upon the number and energy level of the radioactive events and these are analyzed to determine the elements which have become radioactive as a result of the irradiation. By this means the type of mineral being analyzed can be identified. At all times during this procedure, the detector is maintained a fixed distance from the neutron source so that the background radiation received by the detector does not change. In addition, particularly for use under water, a pressure plate is provided which prevents movement of the samples being analyzed during the analysis process.

BRIEF DESCRIPTION OF THE DRAWINGS

The invention is described in the drawings, of which:
FIG. 8 is a cross-sectional view of the springs for positioning the pressure plate.

DESCRIPTION OF THE PREFERRED EMBODIMENT

Figure 1:
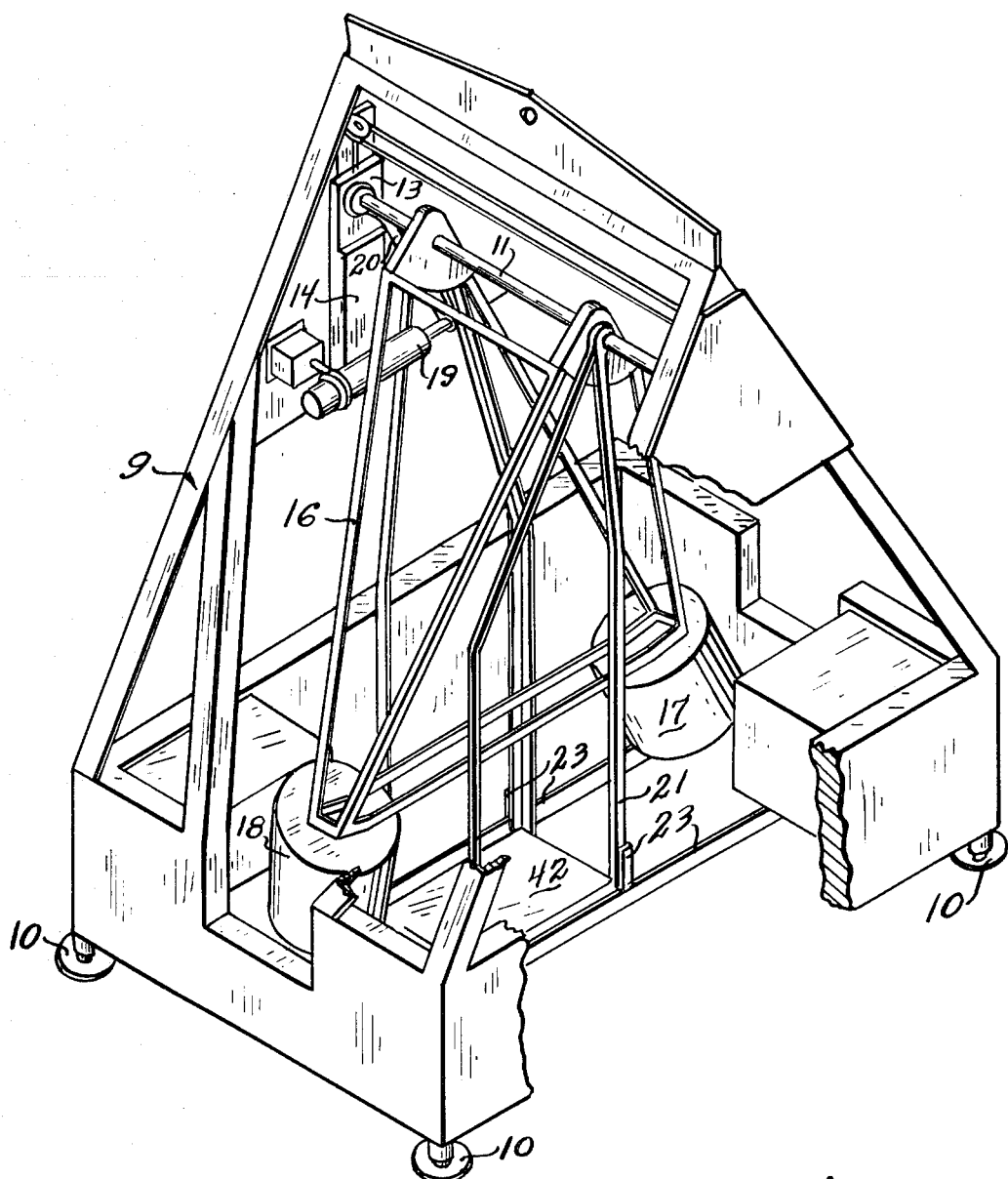
FIG. 1 is an isometric view of the structure.

Referring to FIGS. 1 and 8, there is shown an isometric view of the in-situ neutron activation analysis structure of this invention and a cross section of the shaft supporting structure.

The structure 9 is basically an A frame having four legs 10 (one not shown) for supporting the structure in use. A shaft 11 is supported at both ends by bearings 14 and 15 in bearing housings 12 and 13. Bearing housings 12 and 13 are free to move vertically and are pulled downward by springs 22 and 24.

A second A frame structure 16 positioned within the basic structure 9 supports the neutron source housing 17 and the detector housing 18. Supporting structure 16 is rigidly connected to shaft 11 and moves as shaft 11 is rotated. A hydraulic motor 19 is coupled to shaft 11 through crank 20 to rotate the shaft. The hydraulic motor 19 is operated remotely to position the neutron source housing 17 and the detector housing 18 as required. A material stabilizing structure 21 is also fastened to shaft 11 and is held in a vertical position by guides 23 which are rigidly fastened to the basic A frame structure 9. Material stabilization structure 21 is free to rotate on shaft 11 and therefore will remain in the vertical position as shaft 11 rotates. The shaft 11 together with the material stabilization structure 21, detector 18 and neutron source 17 can move vertically as axle 11 moves vertically in response to the force exerted by the springs 22 and 24.

Figure 3:
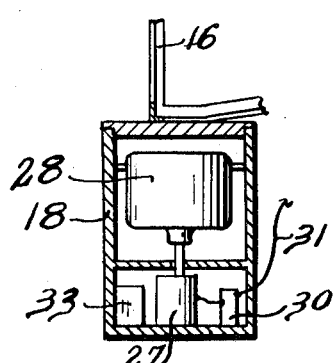
FIG. 3 is a cross-sectional view of the detector housing.

Referring to FIG. 3, there is shown a cross-sectional view of detector housing 18. A Ge(Li) detector 27 is contained within the detector housing 18. Detector 27 is cooled by a cryogenic material contained in dewar 28. The output signal from detector 27 is amplified in preamp 30 and the signal from preamp 30 is transmitted along cable 31 for use at a remote location. A battery pack 33 in the detector 18 can be used to supply power for preamp 30, or power could be supplied from an outside source if so desired.

Figure 4:
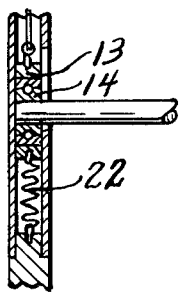
FIG. 4 is a cross-sectional view of the neutron source.
Figure 4:
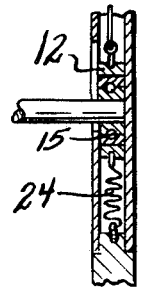
Figure 4:
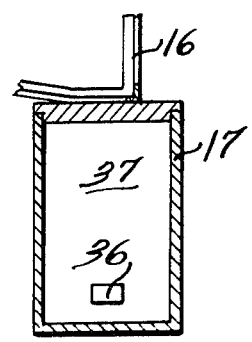

Referring to FIG. 4, there is shown a cross-sectional view of the neutron source housing 17. Neutron source housing 17 contains a source of neutrons 36, such as $^{252}$Cf. The neutron source 36 is embedded in moderator matrix 37 which may be, for example, paraffin. The moderator acts to provide thermal neutrons for the activation analysis technique.

Figure 6:
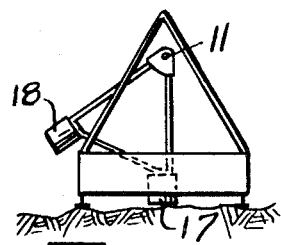
FIGS. 5, 6 and 7 are views showing the use of the structure.
Figure 7:
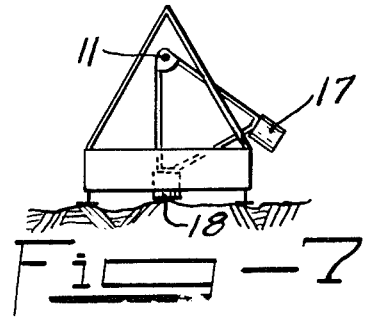
Figure 5:
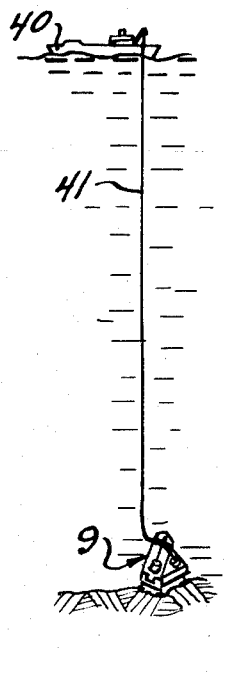

Referring to FIGS. 5, 6 and 7, the structure described can be used remotely to analyze materials which are located in a hostile environment. The structure 9 is shown positioned on the sea bottom and connected to a ship 40 by means of a cable 41. Cable 41 is used to raise and lower the basic structure 9 and to convey all required power and signals between the analyzing structure and ship 40. In use, the neutron source housing 17 is placed over the material to be analyzed, as shown in FIG. 6, and the material is irradiated for a predetermined period of time. After the irradiation has been completed, the detector housing 18 is moved to the position occupied by the irradiator 17, as shown in FIG. 7, and the radiation from the material being analyzed is counted for a predetermined period. In an example of this analyzing technique, the irradiation period might be 300 seconds, the counting period 200 seconds with a period of from 10 to 60 seconds between the counting and irradiation periods. After the counting period has been completed, the basic structure 9 may be picked up and moved to a new location. Since only a few minutes are required for analysis at each site, it can be seen that the structure can be used to cover a relatively wide area in a short period of time by merely raising the structure a few feet from the seabed and moving it to a new location.

As can be seen from the description of the structure and as shown in the drawings, detector housing 18 is maintained at a fixed distance from neutron source housing 17 at all times. Thus, the background radiation seen by detector 27 does not change as a result of its close proximity to the neutron source 36. Further, the detector 27 can be spaced sufficiently far from the neutron source 27 and can be shielded so that the background radiation from the neutron source 36 is low. This structure differs from the structure used for prompt gamma analysis where the detector and the neutron source must be very close together, since there is not sufficient time after irradiation to move the detector into close proximity to the material being analyzed.

Figure 2:
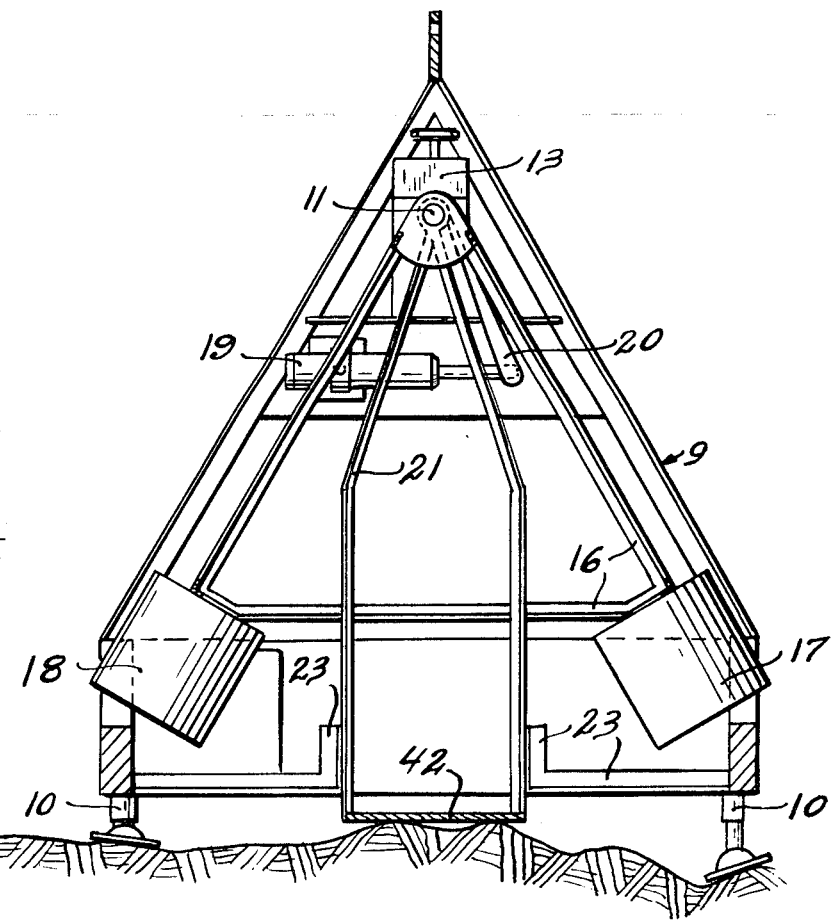
FIG. 2 is a cross-sectional view of the structure.

Referring to FIG. 2, the use of the material stabilizing structure 21 will be explained. Much of the ocean bottom consists of silt and loose mud which is easily disturbed by currents. In order to stabilize material during the few minutes required for analysis, stabilizing structure 21, including a stabilizing plate 42, is used. The stabilizing plate may be made, for example, of an acrylic resin such as LUCITE. The springs 22 and 24 pull the shaft 11 downward. This in turn pulls the stabilizing structure 21 downward and stabilizing plate 42 below the bottom line of the basic A frame structure 9. When the structure is lowered to the bottom of the sea, the stabilizing plate 42 strikes the bottom and is pushed upward as the A frame structure 9 is further lowered. The upward movement of the stabilization structure 21 forces shaft 11 up against the spring tension of springs 22 and 24 until the whole structure is stabilized. The force exerted by springs 22 and 24 pushes the stabilization plate 42 down against the bottom of the ocean to hold the material in place for a short period of time. Any movement of the water surrounding the area, whether due to currents or to the movement of the neutron source housing 17 and detector housing 18, will not disturb the material being analyzed.

Using the system described, very small concentrations of elements can be found in minerals. For example, detectable concentrations of less than one percent of an element in a mineral have been detected for many different elements and minerals. During the counting process, the gamma-ray spectra of the material being analyzed is developed. The photo peaks in these spectra are due to gamma rays emitted by radionuclides which are formed by activation of the stable parent elements. The energy of the gamma ray responsible for each photo peak is directly proportional to the concentration of the elements in the material being analyzed. By identifying the different elements in the material being analyzed, the type of material can be determined.

The embodiments of the invention in which an exclusive property or privilege is claimed are defined as follows:

1. A probe for in-situ neutron activation analysis of materials using delayed gamma rays, including in combination, a mounting frame, a movable supporting structure, an isotope neutron source positioned in a moderator matrix and attached to said movable supporting structure, radiation detection means attached to said movable supporting structure and positioned thereon in a fixed spaced-apart relationship to said isotope neutron source, a stabilizing plate attached to said mounting frame, means for pressing said stabilizing plate against the material to maintain the material in a fixed position, said movable supporting structure being positioned in said mounting frame so that with said movable supporting structure in a first position said neutron source is positioned above said stabilizing plate to irradiate the material and with said movable supporting structure in a second position said detection means is positioned above said stabilizing plate to detect radiation from the material, and control means coupled to said movable supporting structure and said mounting frame for moving said movable supporting structure between said first and second positions.

* * * * *